United States Patent
Piispa et al.

(10) Patent No.: US 12,201,116 B2
(45) Date of Patent: Jan. 21, 2025

(54) HIGH STEARIC OILSEED STEARIN FAT AND PROCESS FOR ITS PREPARATION

(71) Applicants: BUNGE NÖVÉNYOLAJIPARI ZÁRTKÖRUEN MUKÖDO RÉSZVÉNYTÁRSASÁG, Budapest (HU); CONSEJO SUPERIOR DE INVESTIGACIONES CIENTIFICAS, Seville (ES)

(72) Inventors: Eija Piispa, Paimio (FI); Miguel Angel Bootello Garcia, Malaga (ES); Laszlo Hornyak, Üllo (HU); Joaquin J. Salas Linan, Seville (ES); Enrique Martinez Force, Seville (ES); Rafael Garces Mancheno, Seville (ES)

(73) Assignees: BUNGE NÖVÉNYOLAJIPARI ZÁRTKÖRUEN MUKÖDO RÉSZVÉNYTÁRSASÁG, Budapest (HU); CONSEJO SUPERIOR DE INVESTIGACIONES CIENTIFICAS, Seville (ES)

(*) Notice: Subject to any disclaimer, the term of this patent is extended or adjusted under 35 U.S.C. 154(b) by 836 days.

(21) Appl. No.: 16/977,400

(22) PCT Filed: Mar. 1, 2019

(86) PCT No.: PCT/EP2019/055084
§ 371 (c)(1),
(2) Date: Sep. 1, 2020

(87) PCT Pub. No.: WO2019/166598
PCT Pub. Date: Sep. 6, 2019

(65) Prior Publication Data
US 2021/0007364 A1   Jan. 14, 2021

(30) Foreign Application Priority Data

Mar. 1, 2018   (EP) .................................... 18159516

(51) Int. Cl.
| | | |
|---|---|---|
| *A21D 2/16* | (2006.01) | |
| *A23D 7/015* | (2006.01) | |
| *A23D 7/05* | (2006.01) | |
| *A23D 9/04* | (2006.01) | |
| *A23G 9/32* | (2006.01) | |

(52) U.S. Cl.
CPC .............. *A21D 2/165* (2013.01); *A23D 7/015* (2013.01); *A23D 7/05* (2013.01); *A23D 9/04* (2013.01); *A23G 9/327* (2013.01)

(58) Field of Classification Search
CPC .......... A23D 2/165; A23D 7/015; A23D 7/05; A23D 9/04; A23D 9/327
See application file for complete search history.

(56) References Cited

U.S. PATENT DOCUMENTS

| | | | |
|---|---|---|---|
| 5,658,768 | A | 8/1997 | Quinlan |
| 8,114,461 | B2 | 2/2012 | Perlman et al. |
| 2014/0127349 | A1 | 5/2014 | Perlman et al. |

FOREIGN PATENT DOCUMENTS

| | | | | |
|---|---|---|---|---|
| BR | PL0213819 | B1 * | 6/2015 | |
| EP | 1077613 | B1 * | 5/2003 | ............... A23D 9/00 |
| EP | 1689222 | B1 | 3/2010 | |
| JP | H08-509620 | A | 10/1996 | |
| JP | 2007-523596 | A | 8/2007 | |
| JP | 2008-22744 | A | 2/2008 | |
| JP | 2010-081834 | A | 4/2010 | |
| JP | 2017-503519 | A | 2/2017 | |
| WO | 95/07620 | A1 | 3/1995 | |
| WO | 97/028695 | A1 | 8/1997 | |
| WO | 00/074470 | A1 | 12/2000 | |
| WO | 03/037095 | A1 | 5/2003 | |
| WO | 2005/046315 | A1 | 5/2005 | |
| WO | 2011/048169 | A1 | 4/2011 | |
| WO | 2014/016245 | A1 | 1/2014 | |
| WO | 2015/110388 | A1 | 7/2015 | |

OTHER PUBLICATIONS

World Health Organization, "Diet, Nutrition and the Prevention of Chronic Diseases," WHO Technical Report Series 916, 2003, pp. 1-149.
Reske et al., "Triacylglycerol Composition and Structure in Genetically Modified Sunflower and Soybean Oils," JAOCS, 1997, vol. 74, No. 8, pp. 989-998.
Byrdwell et al., "Analysis of Genetically Modified Canola Varieties by Atmospheric Pressure Chemical Ionization Mass Spectrometric and Flame Ionization Detection," Journal of Liquid Chromatography & Related Technologies, 1996, vol. 19, No. 4, pp. 2203-2225.
Fernández-Moya et al., "Oils from Improved High Stearic Acid Sunflower Seeds," J. Agric. Food Chem, 2005, vol. 53, pp. 5326-5330.
Food and Agriculture Organization of the United Nations, "Fats and fatty acids in human nutrition: Report of an expert consultation," FAO Food and Nutrition Paper 91, 2008, pp. 1-166.
Neff et al., "Oxidative Stability as Affected by Triacylglycerol Composition and Structure of Purified Canola Oil Triacylglycerols from Genetically Modified Normal and High Stearic and Laruic Acid Canola Varieties," Lebensm.-Wiss. u-Technol., 1997, vol. 30, pp. 793-799.
Bootello et al., "Dry Fractionation and Crystallization Kinetics of High-Oleic High-Stearic Sunflower Oil," Journal of the American Chemists' Society, 2011, vol. 88, No. 10, pp. 1511-1519.
Apr. 9, 2019 International Search Report issued in International Patent Application No. PCT/EP2019/055084.

* cited by examiner

*Primary Examiner* — Donald R Spamer
*Assistant Examiner* — Assaf Zilbering
(74) *Attorney, Agent, or Firm* — Oliff PLC

(57) ABSTRACT

A high stearic oilseed stearin fat including: from 19% to 95% of disaturated triglycerides in which the (w/w) ratio of disaturated triglycerides with one oleic acid to disaturated triglycerides with one linoleic acid (SOS/SLS) is higher than 1; and at least 1% of trisaturated triglycerides; in which the Ssn-2/Stotal×100 value is of from 11 to 98; and a process for preparing the same.

14 Claims, No Drawings

HIGH STEARIC OILSEED STEARIN FAT AND PROCESS FOR ITS PREPARATION

The present invention relates to a new high stearic oilseed stearin fat and a process for preparing the same by fractionation of partially random interesterified high stearic seed oils with an oleic to linoleic ratio higher than one.

Oilseeds are usually grown and crushed to obtain oils, that are liquid at standard room temperature due to their high levels of unsaturated fatty acids. These oilseed crops, such as soybean, rapeseed, sunflower, cotton, maize, safflower or peanut, have oils rich in oleic, linoleic or linolenic fatty acids, conferring them low melting point temperatures.

However, solid fats are required for many food applications and formulations like bakery, spreads, margarines, confectionary, ice cream, coating compounds, etc. The typical sources of solid fats for these food applications are animal fats, hydrogenated vegetable oils or tropical vegetable fats, mainly palm, palm kernel or coconut, or in minor amount, shea, kokum, illipe, mango kernel, sal, pentadesma, allanblackia and aceituno. The desired source is a commodity oilseed crop that produce a healthy fat. Liquid vegetable seed oils could be used for the production of solid fats by hydrogenation of their unsaturated fatty acids. This process uses a metal catalyst at high temperatures to add hydrogen into the double bonds of the unsaturated fatty acids to produce saturated chains that increase the melting point of fats. However, the catalyst also produces isomerization of the double bonds of some other fatty acids that change their conformation from cis to trans. The intake of this artificial trans fatty acids alters human cholesterol metabolism inducing atherosclerosis. It is thus recommended to totally exclude them from a healthy diet.

Palm oil is a semi-solid fat that is rich in palmitic acid. Palm oil by itself has little applications, and it is traditionally used in some areas of Asia and Africa as cooking and frying oil. However, this oil can be dry fractionated to produce fats with different compositions and solid contents that are broadly used by food industry. Thus, the most saturated fraction is named "palm stearin" having up to 73.8% of palmitic acid and being rich in tripalmitin (up to 60%), a trisaturated triacylglycerol (TAG), which is used as hardstock for margarines as well as in infant fat formulas. Palm fractions rich in disaturated TAGs are named "palm mid fractions". Both fractions, due to their physical properties are used for formulation of spreads, bakery, confectionery fats, etc. The liquid fraction, enriched in diunsaturated and triunsaturated TAGs, is the palm olein that is mainly used for frying.

Most solid fat used in food formulations are obtained from fractions isolated from palm, palm kernel or coconut oils rich in palmitic acid or myristic and lauric acids respectively. The intake of these fats are considered non-healthy for humans, because they alter negatively the content and proportion of cholesterol in blood, increasing the risk of cardiovascular diseases as reported by the World Health Organization (WHO) in a Technical Report of 2003, Series 916 Diet, Nutrition and the Prevention of Chronic Diseases. According to this report, a healthier alternative are oils enriched in stearic acid.

Thus, in the past decades, some oilseeds species, such as sunflower, cotton, soybean, brassica, peanut or maize have been genetically modified to produce higher amounts of stearic acid on their seed oils. These cultivars were produced by techniques of mutagenesis or genetic engineering; all these oils have very low proportion of saturated fatty acids in the sn-2 TAG position and therefore low proportions of asymmetric disaturated and trisaturated TAGs.

In "Triglyceride composition and structure in genetically modified sunflower and soybean oils", (1997) JAOCS 74, 989-998, Reske et al. showed that the proportion of saturated fatty acids in the sn-2 position of TAG was 2.5% in high stearic soybean oils with 35.0% of saturated fatty acids. In "Analysis of Genetically Modified Canola Varieties by Atmospheric Pressure Chemical Ionization Mass Spectrometric and Flame Ionization Detection", Journal of Liquid Chromatography & Related Technologies (1996), 19: 2203-2225, Neff et al. found that on oils from high stearic canola with 40.4% of saturated fatty acids, the percentage of these fatty acids in the sn-2 position is only 3.7%. In "Oils from improved high stearic acid sunflower seeds", (2005) J. Agric. Food Chem. 53. 5326-5330, Fernandez-Moya et al. found that the stearic acid content in the sn-2 TAG position, in high stearic sunflower, was always smaller than 3.6% even for oils with up to 45.3% of saturated fatty acids. In particular, the high stearic-high oleic (HSHO) seed oils, with reduced amount of polyunsaturated fatty acids, such as the oils from soybean with 22% stearic and 63% of oleic acids, sunflower with 24% stearic and 58% of oleic acids or brassica with 20% of stearic and 62% of oleic acids, are an alternative source of saturated fat.

Fats rich in stearic acid are considered healthy due to the fact that stearic acid does not have relation with cardiovascular diseases as reported by WHO in "Fats and fatty acids in human nutrition Expert and consultation report" in 2010.

HSHO seed oils are liquid, semi-liquid or semi-solid depending on the content of saturated fatty acids. They have to be fractionated in order to obtain solid fractions called stearins with higher content of stearic acid and liquid fractions called oleins. Stearins also contain more solids than the feedstock, to be used in food formulations that demand use of hardstock. These oils can also contain a certain level of natural waxes.

Various methods of fractionation have been reported in the past, such as methods for solvent or dry fractionation of HSHO seed oils.

Solvent fractionation is based on the crystallization at low temperature of the oil previously dissolved in an organic solvent like hexane or acetone. The resulting crystals are filtered to obtain a stearin fraction. The solvent fractionation method is efficient and provides fractions with very high levels of solids. Nevertheless, the resulting HSHO seed oil stearins fractions have mainly symmetric disaturated TAGs (SUS) but very low amount of asymmetric disaturated TAGs (SSU and USS) and trisaturated TAGs (SSS), resembling natural cocoa butter, due to the low amount of saturated fatty acids on the sn-2 position of the original oils.

Dry fractionation involves the crystallization of the oil without the addition of any solvent followed by filtration of the resulting fat crystals. During filtration the olein entrapped in the solid fraction has to be expelled, which, for example, is made by squeezing the stearin cake in a membrane filter at high pressures. This method, which can be implemented at lower cost, has been extensively studied, but presents difficulties, such as the narrow temperature window in which to perform fractionation, from 15° C. to 18° C., because at temperatures higher than 18° C., there is a very low stearin yield, and at lower than 15° C., the obtained stearins have low solid fat contents and are too soft to be used in applications. Moreover, the filtration rates of these oils are usually slower than in other oils due to the presence of small crystals that clog the filter cloth. The olein cannot be totally expelled from the stearin, resulting in lower levels of saturated fatty acids in stearin. Thus, performance of this process is low and, finally, high amounts of disaturated TAGs remain on the olein fraction.

Stearins from fractionation of non-modified high stearic seed oils have mostly symmetric disaturated TAGs of the general structure "SUS", and very low trisaturated TAGs ("SSS"), due to the low proportion of saturated fatty acids on the sn-2 position that are on original high stearic vegetable seed oils. High stearic acid seed oils, which have been reported from soybean, sunflower and canola, have higher content of stearic acid and their derivatives, arachidic and behenic acids, the amount of palmitic acid being the same as in the standard oils. Nevertheless, these oils and their derived stearins have low content of stearic, arachidic and behenic acids on the sn-2 position of the TAG.

Calculation of total fatty acids composition and the distribution of the saturated and unsaturated acyl groups in fats can be carried out by, for example, standard methods from the International Organization for Standardization (ISO). Standard Methods ISO 12966-2:2017 "Preparation of methyl esters of fatty acids" and ISO 12966-4:2015 "Determination by capillary gas chromatography of fatty acid methyl esters" make possible to determine the total composition of fatty acids of the fat, expressed as percentage, and in particular the composition of saturated fatty acids of the total fat (Stotal). Moreover, standard method ISO 6800:1997 "Determination of the composition of fatty acids in the 2-position of the triglyceride molecules" depicted how to determine the fatty acids composition of the sn-2 position of a fat. This involved its incomplete hydrolysis with pancreatic lipase, resulting sn-2 monoglycerides, which represents the fatty acids composition on sn-2 of the TAG, and free fatty acids, released from sn-1 and sn-3 positions of TAGs. The sn-2 monoglycerides are separated by thin layer chromatography (TLC), converted to methyl esters and their fatty acids composition analysed by capillary gas-liquid chromatography and so, the percentage of saturated fatty acids in the sn-2 position (Ssn-2) can be known.

The ratio of saturated fatty acids in sn-2 to total saturated fatty acids in the oil as percent is defined as being the value Ssn-2/Stotal×100. This value allows determining if there is a fully random, partial random or non-modified distribution of saturated fatty acids, within the TAG molecule. In the situation where there are no saturated fatty acids in sn-2 position (so Ssn-2 would be zero), Ssn-2/Stotal×100 value will be zero. In that case no trisaturated TAGs (SSS) would be present in the fat and all disaturated TAG must be of the type SUS (this is symmetrical TAG). In a fat where saturated fatty acids were equally distributed among the three positions of the TAGs (this would be the case of a chemically interesterified fat) the composition of saturated fatty acids would be the same in all positions and the value on sn-2 equal to that in the fat. As an example, in a fully random (chemically) esterified fat with 40% saturated fatty acids, the Stotal is 40% and Ssn-2 is 40%. In this case calculation of Ssn-2/Stotal×100 gives results 100, (($S_{sn-2}$=40/$S_{total}$=40)× 100)=100. In a non-modified fat in which the percentage of saturated fatty acids in sn-2 analysed after pancreatic lipase hydrolysis is 3.6% whereas percentage of saturated fatty acids in the total fat is 34.0% the Ssn-2/Stotal×100 value will be (3.6/34.0)×100=10.6.

The Ssn-2/Stotal×100 value gives more complete information of the distribution of fatty acids into TAGs than the simple composition of saturated fatty acids in the sn-2 position, that does not take care of the total saturated, so it will be used to quantify the magnitude of randomization in oils and stearins. On non-modified vegetable HSHO seed oils, this value is usually smaller than 11 and the HSHO seed oils have less than 1% of trisaturated TAGs (SSS).

In prior art, fatty acids rearrangement within TAG molecules has been used to increase the solid content of oils and fats. This generally involves a reaction between vegetable oils and, sometimes, a source of saturated fatty acids that can be other oil, a hydrogenated oil or just saturated fatty acids or esters. In this regard, WO-A-97/28695 relates to a method to produce an edible fat-composition which is suitable for making a spread by random ester interchange of high stearic and high linoleic acids soybean and rapeseed oils. This oil was subjected to random interesterification and the obtained fat displayed high amount of disaturated TAGs with more disaturated TAGs having mainly linoleic acid as unsaturated fatty acid than disaturated TAGs having oleic acid. It was used for spread manufacture without further hydrogenation or fractionation. The high amount of linoleic acid is not desirable due to its low oxidative stability.

Total randomization of fats has been applied to high saturated vegetable oils to increase their solid fat content, in which all saturated fatty acid are equally distributed between the three positions of TAG. Random interesterification without further fractionation of HSHO sunflower oil and others is shown in WO-A-2014/016245. The proportion of SSS, SUS and SSU are increased as well as the solid fat content, having a maximum of 18.2% at 10° C. and 3.7% at 20° C.

To date, there remains a need for oilseed stearin fractions with higher solid content and a process for preparing the same.

It has now surprisingly been found a new methodology involving partial random interesterification of the oils followed by fractionation allowing production of solid stearin with significantly increased di and trisaturated TAG, and more stearic acid as well as arachidic and behenic acids.

Accordingly, the present invention relates to a high stearic oilseed stearin fat comprising:
  from 19% to 95% of disaturated triglycerides in which the (w/w) ratio of disaturated triglycerides with one oleic acid to disaturated triglycerides with one linoleic acid (SOS/SLS) is higher than 1;
  and at least 1% of trisaturated triglycerides;
  in which the $S_{sn-2}/S_{total}$×100 value is of from 11 to 98.

Stearin fat according to the present invention from this fractionation displays higher content of solids than stearins produced by sn-1,3-specific enzymatic interesterification, dry fractionation or both method together from the same initial oil in the previous art, displaying also wider melting intervals and is appropriate for its use in baking, filing fats, confectionary, spreads, coating compounds, ice cream, margarine formulation and as shortening fat. Furthermore, stearin fat according to the present invention contains disaturated TAGs, mixture of symmetric (SUS) and asymmetric (SSU and USS), due to increased amount of saturated fatty acid in sn-2 position. Stearin fat according to the present invention thus has improved crystallisation properties and functionality resulting from increased solid fat content in lower temperatures, which enables their use in wide range of product applications.

In the context of the present invention:
  "high stearic" designates a seed, oilseed, oil, fat or stearin having a content of stearic acid higher than 11%;
  "high stearic oilseed" designates an annual oilseed crop such as sunflower, brassica, cotton, maize, peanut, soybean or safflower, having a content of stearic acid higher than 11%;

"HSHO seed oil" designates high stearic high oleic seed oil obtained from high stearic oilseed having an oleic to linoleic ratio higher than 1;

"S" designates saturated fatty acids such as palmitic, stearic, arachidic and behenic acids;

"U" designates unsaturated fatty acids such as oleic, linoleic and linolenic acids;

"TAG" designates triacylglycerol molecules, with a glycerol backbone and 3 fatty acids esterified to it. TAGs are named by three letters representing the fatty acids that are esterified on it at the different 3 positions of the glycerol molecule, said fatty acids being saturated ("S") or unsaturated ("U");

"UUU" designates triunsaturated TAG.

"USU" and "SUU" or "UUS" designates diunsaturated TAG (SUU and UUS being identical and both designated by SUU);

"SUS" designates disaturated TAG with symmetric stereochemical position of saturated fatty acids;

"SSU" or "USS" designates disaturated TAG with asymmetric stereochemical position of saturated fatty acids (SSU and USS being identical and both designated by SSU), "SSS" designates trisaturated TAG;

"sn-1", "sn-2" and "sn-3" designates the three stereochemical positions of fatty acids in TAG molecule;

"hardstock" designates a fat used as solid phase in food applications for giving structure, for example spreads or margarines;

"SFC" designates Solid Fat Content measured by pNMR (Pulsed nuclear magnetic resonance) as the percentage mass fraction of fat in the solid state according to the ISO 8292-1:2008 method for non-stabilising fats;

"ppm" designates parts per million by weight; and
unless otherwise specified, all % values are weight %.

The present invention relates to high stearic oilseed stearin fat comprising disaturated and trisaturated triglycerides and having a specific $S_{sn-2}/S_{total} \times 100$ value.

Preferably, the present invention relates to a high stearic oilseed stearin fat composition as defined above possessing the following characteristics, taken individually or in combination:

high stearic oilseed stearin fat is obtained from seed oils selected from sunflower, brassica, cotton, maize, peanut, soybean or safflower oilseeds or mixed thereof; said oils containing
  more oleic acid than linoleic acid, more preferably the (w/w) ratio of oleic acid to linoleic acid is higher than 2, still preferably the (w/w) ratio of oleic acid to linoleic acid is higher than 5;
  more than 11% of stearic acid, more preferably more than 12%, still preferably more than 14% of stearic acid, and even more preferably more than 16% of stearic acid,
  and up to 24% of linoleic acid, preferably up to 20% of linoleic acid and more preferably up to 15% of linoleic acid;

high stearic oilseed stearin fat comprises from 19% to 89% of disaturated triglycerides, more preferably from 19.5 to 84.5% of disaturated triglycerides, still preferably from 24.4% to 76.8% of disaturated triglycerides, even more preferably from 28.1% to 52.6% of disaturated triglyceride;

the ratio of disaturated triglycerides with one oleic fatty acid to disaturated triglycerides with one linoleic fatty acid (SOS/SLS) is higher than 2.3, more preferably higher than 16.9, still preferably higher than 108.7;

the total amount of trisaturated triglycerides is higher than 1.3%, more preferably higher than 3.6%, still preferably higher than 8.7%, even more preferably higher 22.6%;

$S_{sn-2}/S_{total} \times 100$ value is of from 13.5 to 95.6, more preferably from 27.2 to 92.2, still preferably from 41.0 to 77.0;

the total amount of triunsaturated triglycerides is higher than 2.2%, more preferably higher than 6.8%, still preferably higher than 13.6%; and/or high stearic oilseed stearin fat contains at least 625 ppm of waxes, more preferably at least 785 ppm of waxes.

High stearic oilseed stearin fat according to the present invention may be prepared by fractionation of a mixture of interesterified high stearic seed oil, fat or stearin and not interesterified not hydrogenated high stearic oil, fat or stearin, having from 10% to 90% of interesterified high stearic seed oil. Accordingly, the present invention also relates to a process for preparing high stearic oilseed stearin fat as defined above, said process comprising the following steps:

a) interesterification of HSHO seed oils by using any commercial lipase resulting in partial random rearrangement of saturated fatty acid into the triglycerides molecules; and b) at least one fractionation of said partial random interesterified HSHO seed oils or their stearins.

In the process according to the present invention, and contrary to known processes, the starting HSHO oil does not need to be dewaxed. To the date, oils had to be dewaxed to avoid that wax crystals interact with the crystallized TAGs in the fractionation slurry hampering the step of filtration. However, dewaxing is costly because it is necessary to keep the oil cold for a long time (at least 24 h) and it involves the filtration of the oil with filter aid, which implicates oil losses in this operation. Lost oil would contain mainly trisaturated and disaturated TAGs that are target product to collect as hardstock, thus winterisation is negatively affecting hardstock yields. Winterization also produces residue (used filter aid carrying waxes and residual oil) that has to be managed. According to the present invention, winterisation is not needed, due to improved crystallisation and filtering properties resulting from new mixture of symmetric and asymmetric disaturated and triunsaturated TAGs, and since the initial oil is not dewaxed, the stearin product contains waxes too which increase solid content and does not affect oil crystallization and/or filtering. Oil is crystallized by just only decreasing its temperature. In addition to improving final stearin characteristics, the absence of dewaxing step also reduces costs.

Furthermore, in the process according to the present invention, fatty acids of the HSHO oils are rearranged in such a way that partially random interesterification of saturated fatty acids is produced, moving part of the saturated fatty acids from sn-1,3 to the sn-2 position of the TAG molecule. In contrast to crystallization and dry fractionation of non-modified high stearic seed oils, having more symmetric TAG structures, the filtration of these partial random interesterified oils can be made at low temperatures, down to 6° C., 2° C. or even down to −2° C. This process gives place to crystallized slurries that can be fast and easily filtered in a membrane press filter resulting two products: a solid fat called stearin and a liquid oil called olein. The stearin fraction can be squeezed at standard (2 to 10 bar) or higher pressures (10 to 30 bars, or even 50 bars) and is produced at yields higher than those described in the previous art for the fractionation of the same non-modified or sn-1,3-specific enzymatically esterified oils.

The present invention relates to a process for preparing high stearic oilseed stearin fat, said process comprising a step of interesterification and a step of fractionation.

Preferably, the present invention relates to a process for preparing high stearic oilseed stearin fat conducted under the following conditions, taken individually or in combination:
- feedstock used in the process according to the present invention is HSHO oil crushed from oilseeds such as sunflower, brassica, cotton, maize, peanut, soybean or safflower, such as sunflower oil that can be extracted from seeds as disclosed in WO-A-00/74470 or as reported by Fernandez-Moya et al. in "Oils from Improved High Stearic Acid Sunflower Seeds", J. Agric. Food Chem. 2005, 53: 5326-5330;
- interesterification (step a)) is carried out by using from 0.1% to 10.0% of any commercial lipase, more preferably from 0.5% to 8% of any commercial lipase, still preferably from 1% to 5% of any commercial lipase;
- commercial lipase is chosen as being Lipozyme TL IM;
- interesterification (step a)) is carried out at a temperature of from 50° C. to 80° C.;
- interesterification (step a)) is carried out for a period of time of from 20 minutes to 30 hours, more preferably from 2 hours to 30 hours, still preferably from 2 hours to 24 hours, even more preferably from 2 hours to 18 hours, most preferably from 5 hours to 12 hours;
- fractionation (step b)) is a dry fractionation. More preferably the dry fractionation comprises the steps of crystallization by:
  - cooling of completely melted oil to a temperature in the range of from 5° C. to 25° C. during a period of time of from 20 minutes to 15 hours,
  - and then cooling to a final temperature in the range of from −10° to 22° C., more preferably from −2° C. to 16° C., still preferably from 2° C. to 6° C., fora period of time of from 10 minutes to 48 hours; and
  - separation the solid stearin and liquid olein by pressure filtration, vacuum filtration or centrifugation;
- fractionation (step b)) is a solvent fractionation. In solvent fractionation, fat is dissolved in an organic solvent, kept at selected temperature and time to form micelle structure. Once this crystallization step is ready, the micelle is filtered at vacuum and the resulting stearin filtrate is washed with fresh solvent to remove entrapped olein. After filtration, the solvent is evaporated from stearin. More preferably, the solvent fraction is conducted by using organic solvent or a blend of solvents with a ratio oil to solvent (v/v) of from 1/0.2 to 1/11 at temperature of from 25° C. to −20° C.

In an alternative embodiment, the process can be carried out by fractionation of a mixture of interesterified high stearic seed oil, fat or stearin and no interesterified no hydrogenated high stearic oil, fat or stearin, in which mixture consists of 10% to 90% interesterified high stearic seed oil, fat or stearin.

Under those enzymatic interesterification conditions, part of saturated fatty acids move from the sn-1 and sn-3 positions to the sn-2 position of the TAG molecule resulting in increased sn-2 saturated TAG. These partial random interesterified oils contain symmetric and asymmetric disaturated and trisaturated TAGs, due to the increased amount of saturated fatty acids in the sn-2 position of TAG.

In this embodiment, fractionation comprises crystallization steps and subsequent separation, for example, by filtration of the resulting fat coming from a feedstock comprising the mixture of interesterified high stearic seed oil, fat or stearin and no interesterified no hydrogenated high stearic oil, fat or stearin.

The crystallization step can be carried out in any reactor or crystallizer with controlled stirring and temperature. For crystallization the partial random HSHO oil is first heated up to at least 60° C. Temperature is chosen to be high enough to destroy all crystal structures and crystal structure memory in oil. Heated oil is cooled down to a crystallization temperature from 35° C. to −5° C., in which crystallization time is from 1 to 48 hours. Preferably crystallization is done using temperature program, where first crystallisation temperature from 35° C. to 16° C., maintained for 30 minutes to 15 hours after which temperature is decreased to temperatures from 15.9° C. to −5° C. where crystallization continues from 10 minutes to 16 hours. Even more preferably, crystallization is done using a temperature program, where first crystallisation temperature is from 25° C. to 18° C., maintained for 1 to 6 hours after which temperature is decreased to temperatures from 16° C. to −2° C. where crystallization continues for 2 to 16 hours. In the situation where crystallization is conducted at constant (isothermal) temperature, this temperature is preferably of from 16° C. to 4° C., and crystallisation time is of from 2 to 24 hours.

Once crystallization is complete, the resulting slurry is separated into two fractions: the stearin and the olein. This separation may be made by centrifugation, vacuum filtration with or without later cake squeezing or preferably by pressure filtration. In pressure filtration the stearin cake is constructed by increasing filtration, to standard (2 to 10 bar) and high pressure (10 to 50 bars). Liquid olein phase passes through the filter, while stearin can be collected from said filter. The filtration is made at temperatures from 18° C. to −2° C., preferably at the same temperature than crystallization.

A second fractionation step, conducted on the obtained stearin fat, with final crystallization temperature up to 30° C., can be made to increase the amount of disaturated and trisaturated TAG.

The process according to the present invention results in higher stearin yields than those found in fractionation of non-randomized HSHO seed oils. Another advantage is that filtration rates are much higher than those found in fractionation of non-modified HSHO oil making process faster and thus significantly improved. Even at the indicated low temperatures the stearin cake can be squeezed at high pressures, 10 to 30 bars, without breaking the cake, resulting to higher fractioned stearin yield than in previous art.

The different chemical structure of the obtained stearins, preferably with its natural waxes, result in better technological properties than previous stearins produced from non-modified HSHO seed oils, due to the fact that they contain more disaturated TAGs, being a mixture of symmetric TAGs (SUS) and asymmetric TAGs (SSU+USS), increasing at the same time the trisaturated TAGs content. As on improvement these stearins also display more SFC than previous stearins at temperatures from 10° C. to 30° C. due to modified TAG structures.

High stearic oilseed stearin fat according to the present invention may be used in food applications and formulations. Accordingly, the present invention also relates to shortening, margarine, spread, blended spread, bakery fat, frying fat, filling fat, coating compound, confectionary fat or ice-cream fat containing high stearic oilseed stearin fat according to the present invention.

Finally, high stearic oilseed stearin fat according to the present invention may be used for preparing food products. Accordingly, the present invention also relates to the use of high stearic oilseed stearin fat according to the present invention for preparing shortening, margarine, spread, blended spread, bakery fat, frying fat, filling fat, coating compound, confectionary fat or ice-cream fat.

The present invention will now be illustrated in a non-limiting manner by the following examples.

NON ILLUSTRATIVE EXAMPLE

Prior Art Stearins

Table A

Table A below reports fatty acids composition, TAG classes, saturated content in sn-2, total saturated content $S_{total}$ and ratio $S_{sn-2}/S_{total} \times 100$ values obtained from them, of non-modified high stearic seed oils from soybean, sunflower and canola, and three stearins from dry fractionation of non-modified high stearic and high oleic sunflower oil disclosed in the following reference prior art documents:

Reske et al.—Triglyceride composition and structure in genetically modified sunflower and soybean oils (1997) JAOCS 74, 989-998;

Fernandez-Moya et al., 2005, J. Agric. Food Chem. 53, 5326-5330;

Neff et al., 1997, Lebensm.-Wiss. u.-Technol. 30, 793-799; and

Byrdwell and Neff, 1996, J. Liq. Chrom. & Rel. Technol. 19, 2203-2225.

Data are expressed in % (w/w).

TABLE A

| | Non-modified high stearic oils | | | Non-modified dry fractionated stearin | | |
|---|---|---|---|---|---|---|
| | HS Soybean[1] | HS Sunflower[2] | HS Canola[3,4] | HSSF Stearin A | HSSF Stearin B | HSSF Stearin C |
| Palmitic acid | 8.1 | 5.4 | 3.6 | 4.4 | 6.3 | 6.1 |
| Stearic acid | 24.7 | 24.9 | 27.5 | 21.9 | 34.0 | 28.1 |
| Oleic acid | 17.2 | 57.8 | 33.5 | 65.9 | 51.9 | 58.1 |
| Linoleic acid | 39.2 | 8.2 | 18.4 | 3.6 | 2.3 | 2.9 |
| Linolenic acid | 8.3 | — | 13.7 | — | — | — |
| Arachidic acid | 1.5 | 1.8 | 1.2 | 1.6 | 2.4 | 2.1 |
| Behenic acid | 0.7 | 1.9 | 0.4 | 2.6 | 3.1 | 2.8 |
| SSS | 0.0 | 0.0 | 0.8 | 0.1 | 0.3 | 0.4 |
| SUS + SSU | 27.7 | 18.5 | 24.6 | 17.6 | 50.3 | 37.4 |
| USU + SUU | 41.3 | 61.9 | 49.6 | 52.9 | 30.6 | 38.0 |
| UUU | 23.1 | 19.2 | 22.4 | 29.5 | 18.8 | 24.2 |
| $S_{sn-2}$ | 2.5 | 3.6 | 1.4 | 2.3 | 3.2 | 3.5 |
| $S_{total}$ | 35.0 | 34.0 | 32.7 | 30.5 | 45.8 | 39.1 |
| $S_{sn-2}/S_{total} \times 100$ | 7.1 | 10.6 | 4.3 | 7.5 | 7.0 | 8.9 |

[1]Reske et al. 1997;
[2]Fernandez-Moya et al. 2005;
[3]Neff et al. 1997;
[4]Byrdwell and Neff, 1996

The oils described in Table A have been extracted from high stearic mutant or genetically modified oilseeds, they have increased amount of stearic acid, arachidic and behenic acids, 20 and 22 carbon fatty acids, produced enzymatically by elongation of the stearic acid. In these oils, fatty acids with less than 18 carbon, such as palmitic acid, having 16 carbon, or smaller are not important, having similar content than the standard seed oils.

Table B

Table B reports TAG classes composition and ratio of disaturated TAG with one molecule of oleic acid to disaturated TAG with one molecule of linoleic acid of two high stearic high oleic oils, HS 4 and HS 5 oils, and the corresponding oils after acyl rearrangement, EIE HS 4 and EIE HS 5. S: saturated fatty acid, U: unsaturated fatty acid, 0: oleic acid and L: linoleic acid.

Data expressed in % (w/w).

TABLE B

| | HS 4 | HS 5 | EIE HS 4 | EIE HS 5 |
|---|---|---|---|---|
| SSS | 0.0 | 0.0 | 1.0 | 1.1 |
| SUS + SSU | 13.4 | 12.9 | 13.9 | 13.3 |
| USU + SUU | 44.5 | 45.4 | 39.9 | 40.8 |
| UUU | 42.1 | 41.8 | 45.2 | 44.8 |
| SOS/SLS | 3.8 | 5.8 | 6.3 | 11.2 |

Table C

Table C is a comparative table of final fractionation temperatures, yields and content of disaturated and trisaturated TAGs of stearins according to the present invention and in the following reference prior art documents, working with the same quality of HSHO oils:

Bootello et al., Dry Fractionation and Crystallization Kinetics of High-Oleic High-Stearic Sunflower Oil, JAOCS 88:1511-1519;

WO-A-2011/048169.

Data are expressed in % (w/w).

TABLE C

| | Final fractionation temperature (° C.) | Yield of stearin | SSS | SUS + SSU |
|---|---|---|---|---|
| Stearin 7 | 12.0 | 23.5 | 4.8 | 34.6 |
| Stearin 8 | 10.0 | 26.3 | 3.8 | 33.9 |
| Stearin 9 | 8.0 | 27.8 | 3.4 | 33.2 |
| Prior art Stearin D[1] | 19.0 | 9.4 | n.d. | 33.9 |
| Prior art Stearin E[1] | 18.0 | 10.9 | n.d. | 30.4 |
| Prior art Stearin F[2] | 18.0 | 9.8 | n.d. | 35.6 |

[1]Bootello et al.;
[2]WO2011048169.

The resulting stearins, obtained at larger yields, more than 2-fold higher as shown in Table C, contain also higher levels of TAGs of the general formula SUS (SUS+SSU) and SSS, up to 39.4%, than stearins in the previous art, which makes them having more solids. The stearins resulting from the described process of fractionation are healthy fats containing unsaturated fatty acids, mainly oleic acid, and increased amount of the healthy stearic fatty acid. The TAG composition and yields of the resulting stearins can vary depending on the composition of the feedstock and the final crystallization temperatures and ramps applied during fractionation.

Example 1

Oil Crushing and Refining

For the trials, oil was obtained by crushing the seeds in an expeller pressing and further solvent extraction. The extracted oil was then submitted to refining and bleaching. Oils obtained by pressing contain low level of phosphorous, so they were not degummed. The removal of free fatty acids was carried out by chemical neutralization with Baumélye (12% 2.8 M) at 15° C. for 40 min. Soaps resulting from neutralization were removed by centrifugation and applying several water washes followed by centrifugation. The excess of pigments was removed by bleaching with Tonsil bleaching earth (1% w/w) at 70° C. for 10 min. The neutralized/ bleached oil was then deodorized for 3 h at 200° C. under vacuum applying a continuous steam flow. The oil can be dewaxed or not.

Example 2

Analysis and Calculation of Results 2.1. Analysis of TAGs

The composition of TAG species was analysed by gas chromatography of an Agilent 7890 gas chromatograph endowed with a 30 m. Quadrex aluminium-clad bonded methyl 65% phenyl silicone capillary column, 0.25 mm ID., 0.1 micron film thickness, using hydrogen as the carrier gas and FID detector according to Fernandez-Moya et al. J. Agr. Food Chem. 2000, 48:764-769. TAG classes (SSS, SUS, SUU, UUU) results were calculated from detailed TAG species results.

2.2. Analysis of Fatty Acid Composition and Calculation of $S_{total}$

Fatty acids composition analysis is based on ISO/TS 12966-4:2015 standard method. Fatty acids methyl esters derived by transesterification or esterification from fats, oils, and fatty acids are analyzed by capillary gas chromatography in a Hewlett-Packard 6890 gas chromatography apparatus equipped with a Supelco SP-2380 fused silica capillary column. The different methyl esters were identified by comparing their retention times with those of known standards, and by using the example chromatograms of Annex B provides in ISO/TS 12966-4:2015 standard method.

Total saturated fatty acid content, $S_{total}$ (%), is calculated from the fatty acids composition of the oil as the addition of all the saturated fatty acids presented in said oil. Thus, for HSHO oil, $S_{total}$ is the addition of palmitic acid (16:0), stearic acid (18:0), arachidic acid (20:0) and behenic acid (22:0).

2.3. Analysis of Fatty Acids Composition in the sn-2 Position of the Triglycerides Molecules and Calculation of $S_{sn-2}$ The fatty acids composition in the sn-2 positions of TAGs is determined using a protocol based on ISO/TS 6800:1997 standard method. In this method, the fat is hydrolyzed with pancreatic lipase producing sn-2 monoglycerides and free fatty acids released from sn-1 and sn-3 positions of TAG. The sn-2 monoglycerides are separated by thin layer chromatography and their fatty acid compositions are analyzed as methyl esters by capillary gas chromatography.

Total saturated fatty acid content in sn-2 position, Ssn-2 (%), is calculated from the fatty acids composition of the corresponding sn-2 monoglycerides as the addition of all the saturated fatty acids presented in said sn-2 monoglycerides.

2.4. Calculation of the Ratio of $S_{sn-2}/S_{total} \times 100$ Values $S_{sn-2}/S_{total} \times 100$ ratio values as percent are obtained when total saturated fatty acid content in sn-2 position of TAGs (obtained in the 2.3 section by ISO/TS 6800:1997 standard method) is divided by total saturated fatty acid content in the oil (obtained in the 2.2 section by ISO/TS 12966-4:2015 standard method) and multiplied by 100.

2.5. Measurement of Stearin Yield

Stearin yield (%) was calculated by dividing the mass of stearin fraction by the mass of stearin plus olein and multiplied by 100.

2.6. Determination of the Solid Fat Content of Oils, Fats or Stearins

The AOCS official method for solid fat content direct determination based in pNMR (AOCS Official Method Cd 16b-93) was used.

Example 3

Partial Random Interesterification and Fractionation of HSHO Seed Oil

HSHO refined, dewaxed or preferably non-dewaxed, sunflower oil was submitted to partial random interesterification by enzymatic reaction and to fractionation, dry or solvent fractionation, see below. This reaction was carried out in a reactor in the presence of a 5% w/w of commercial Lipozyme TL IM (Novozymes), which had been previously conditioned with the same oil at vacuum for 1 h to remove humidity and prevent TAG hydrolysis. The rearrangement reaction was run at 70° C. for 10 h in a stirred batch reactor keeping a stirring rate at 150 r.p.m. Once reaction was accomplished, the immobilized enzyme was separated by vacuum filtration through a porous plate. The enzyme can be reutilized for subsequent rearrangement reactions. The oil composition before and after the enzymatic reaction are shown in Table 1. The modified oil was then submitted to fractionation. The jacketed crystallizer is connected to a press membrane filter. The rearranged HSHO oil was loaded into the crystallizer and heated up to 60° C. with a stirring rate of 40 r.p.m. With this step, any previous solid structure in the oil was destroyed to make the process reproducible. Once that temperature was reached, the oil was cooled down to a temperature from 22° C. to 16° C. (18° C. in this example) keeping the same stirring rate. Once the oil reached that temperature, the stirring was slowed down to 10 r.p.m. The oil was let to crystallize at that temperature for 5 h-8 h. Then, the temperature of the slurry was slowly decreased, by applying a cooling ramp for 5 h until final, from 14° C. to −2° C., crystallization temperature, was reached and kept for additional 12 h, in this example the final crystallization and filtration temperature was 12° C. The stirring rate was 10 r.p.m. during the whole crystallization process. At this point the slurry was loaded into the press filter by applying pressure into the crystallizer. The pressure was progressively increased from 0 to 1.5 bars in 50 min. Once the flow of olein decreased, the stearin within the filter was squeezed by increasing the pressure into the filter with hydraulic pump. The squeezing pressure was progressively increased from 1.5 to up to 30 bars during a period from 30 min to 4 hours. In this step the olein entrapped into the stearin cake was expelled to produce a stearin enriched in saturated fatty acids. Once the flow of olein stopped, the filter was dismounted to obtain the stearin. After first fractionation process, a second step of fractionation could be made with the same fractionation conditions, except that the final process temperatures are different, in this example, samples from stearin 22 were devoted to a second process, crystallization and filtration temperatures, of stearin 22-1 and 22-2, were of 12.8° C. and 30.0° C. respectively. The second fractionation step increase the amount of disaturated and trisaturated TAG and so the content of solids of the final stearin. The composition of the obtained stearin fats is shown in Table 1.

TABLE 1

TAG classes and fatty acid composition of HSHO sunflower oil before, after enzyme acyl rearrangement and of the stearin resulting from one step and two step dry fractionations.

|  | HS 7 oil | EIE HS 7 | Stearin 22 | Stearin 7 | Stearin 22-1 | Stearin 22-2 |
|---|---|---|---|---|---|---|
| SSS (%) | 0.0 | 1.3 | 4.5 | 4.7 | 8.7 | 22.6 |
| SUS + SSU (%) | 10.5 | 14.0 | 42.4 | 34.5 | 55.0 | 39.0 |
| USU + SUU (%) | 52.0 | 39.8 | 30.7 | 32.8 | 23.7 | 24.4 |
| UUU (%) | 37.5 | 44.8 | 21.4 | 27.8 | 12.6 | 14.1 |

TABLE 1-continued

TAG classes and fatty acid composition of HSHO sunflower oil before, after enzyme acyl rearrangement and of the stearin resulting from one step and two step dry fractionations.

|  | HS 7 oil | EIE HS 7 | Stearin 22 | Stearin 7 | Stearin 22-1 | Stearin 22-2 |
|---|---|---|---|---|---|---|
| Palmitic acid | 4.8 | 4.8 | 5.9 | 6.5 | 6.8 | 7.2 |
| Stearic acid | 16.4 | 16.6 | 30.7 | 28.8 | 38.8 | 47.8 |
| Oleic acid | 71.1 | 71.1 | 47.0 | 55.8 | 39.6 | 37.3 |
| Linoleic acid | 4.4 | 4.1 | 9.4 | 3.1 | 7.7 | 1.1 |
| Arachidic acid | 1.3 | 1.4 | 2.0 | 2.4 | 2.9 | 3.2 |
| Behenic acid | 1.9 | 2.1 | 4.9 | 3.5 | 4.1 | 3.4 |

S: saturated fatty acid,
U: unsaturated fatty acid.
Data expressed in % (w/w).

For stearins 7, 22-1 and 22-2, the Ssn-2 value were 36.9%, 42.0% and 25.3%, and the Stotal 41.1%, 52.6% and 61.6% respectively. Accordingly, the partial random $S_{sn-2}/S_{total} \times 100$ value were 89.8, 79.8 and 41.0 and the ratio of disaturated TAG with one oleic acid to disaturated TAG with one linoleic acid, SOS/SLS were 14.7, 5.5 and 114.8 respectively.

The unexpected and improved properties of these stearins are due to the mixture of asymmetrical and symmetrical disaturated and trisaturated TAG species with at least one molecule of stearic acid, that are accumulated in the stearin, plus the high amount of natural sunflower waxes with high melting points, the wax content of the non-de-waxed oilseed stearin ranged from 920 to 1171 ppm. In this example these TAG species with at least one molecule of stearic acid are increased an average of 2.6 times, while the other TAG species are reduced by an average factor of 0.8. On these stearin fats the stearic, arachidic and behenic saturated fatty acids increased 1.9 times related to the original oil, while the palmitic acid increase only 1.3 times, showing the importance of saturated fatty acids of 18 or more carbon on these oilseed stearins.

Example 4

Effect of Final Crystallization Temperature on Dry Fractionation of HSHO Oils The process described in example 3 can be subjected to variations in operating parameters to obtain higher yields or different TAG composition in the stearin product. Thus, partial random interesterified oil as described in example 3 was submitted to different fractionation trials in the same conditions than described in the example. The non-dewaxed partial random interesterified oils were loaded into the crystallizer and previous solid structure was destroyed by heating at 60° C. At this point, the temperature of the oil was cooled down to 18° C. where oils crystallized for a period of 5 h applying a stirring of 10 r.p.m. After that, temperatures into the crystallizer were decreased applying a temperature ramp of 5 h to lower crystallization temperatures (5 different programs). These temperatures were 14° C., 12° C., 10° C., 8° C. and 6° C. Once those temperatures were reached, the slurries were crystallized for additional 12 hours. Then, the slurries were filtered by feeding them into the membrane press filter. The temperature of the press filter was set to be the same of the last crystallization step. The pressure of filtration was steadily increased up to 2.5-3.0 bars during a period of 35-40 min. and the flow of olein was monitored. Once the flow of olein started to decline, the slurry feeding pipeline was closed and the stearin filtered was squeezed by increasing the pressure within the filter. The pressure within the filter was steadily increased up to 20 bar for a period of 20-30 minutes. Finally, the filter was open and the stearin collected and characterized. (Table 2).

TABLE 2

Final fractionation temperature, TAG classes composition, ratio of disaturated TAG with one oleic acid to disaturated TAG with one linoleic acid, yield of stearin, total saturated, saturated in sn-2 position and Ssn-2/Stotal × 100 value of different stearins obtained by fractionation partial random interesterified HSHO oil applying different final crystallization temperatures.

|  | Stearin 29 | Stearin 6 | Stearin 4 | Stearin 9 | Stearin 10 |
|---|---|---|---|---|---|
| Final fractionation temperature (° C.) | 14 | 12 | 10 | 8 | 6 |
| SSS (%) | 5.7 | 3.9 | 3.5 | 3.5 | 3.8 |
| SUS + SSU (%) | 35.8 | 34.0 | 33.5 | 36.0 | 38.1 |
| USU + SUU (%) | 31.2 | 33.9 | 34.9 | 35.9 | 36.3 |
| UUU (%) | 27.3 | 28.1 | 28.1 | 24.7 | 21.9 |
| SOS/SLS | 16.9 | 23.3 | 19.9 | 24.7 | 13.7 |
| Yield of stearin (%) | 15.9 | 21.5 | 27.2 | 27.8 | 28.6 |
| Ssn-2 (%) | 34.7 | 38.2 | 35.8 | 39.1 | 37.6 |
| Stotal (%) | 39.1 | 40.0 | 38.7 | 42.4 | 42.4 |
| Ssn-2/Stotal × 100 | 88.8 | 95.6 | 92.2 | 92.2 | 88.5 |

S: saturated fatty acid, U: unsaturated fatty acid, O: oleic acid and L: linoleic acid.
Data expressed in % (w/w).

The yield of stearin increased at lower temperatures, up to 28.6% at 6° C., it was remarkable that the slurry was filterable and the stearin squeezable at such a low temperature. The composition of the resulting fractions is also shown in Table 2. Stearins displayed more trisaturated TAGs when they were produced at higher temperatures (12° C., 14° C.). This effect was due to the quick and complete precipitation of SSS TAGs at these temperatures. When decreasing fractionation temperature, the incorporation of disaturated TAGs to the stearin was higher and respectively the amount of these disaturated TAGs left in the oleins was lower. Contents of disaturated TAGs in the stearins ranged within 33.5% and 38.1% of the total TAGs (Table 2) and content of disaturated TAGs plus trisaturated TAGs ranged between 37.0% and 41.7% of total TAGs, showing that this method makes possible to fractionate the oil at very low temperatures with minimum alterations in the stearin product allowing production of a stearin with small variation in trisaturated (SSS) plus disaturated (SUS, SSU) triglycerides amount in final stearin. These new stearins exhibit significantly higher content of trisaturated TAGs (3.5-5.7%) and saturated fatty acid in sn-2 position (Ssn-2/Stotal×100 ratio is between 88.5-95.6) compared to stearins from non-modified HSHO oils (Table A, stearin A, stearin B and stearin C: trisaturated TAGs 0.1-0.4% and Ssn-2/Stotal×100 value: 7.0-8.9) showing clear evidence that these new stearins have increased content of solids. Stearins 4 and 6, obtained from non-dewaxed HSHO sunflower oils, have 745 and 1353 ppm of waxes, respectively. Initial HSHO oil contains on average 759-920 ppm waxes and dewaxed HSHO oils contain 366-624 ppm waxes. Result of stearins shows, that fractionation worked well for non-dewaxed oils and waxes are found in resulting stearin fraction. No negative effect of waxes to fractionation process was seen. Resulting stearins have improved structure and can be used as hardstock in food applications.

Example 5

Effect of Initial Stearic Content on Dry Fractionation of HSHO Oils

The method described in this patent can be used with oils with different initial concentration of stearic acid. Thus, oils with a concentration of stearic acid of 11%, can be fractionated applying the method of this invention. Refined non-dewaxed sunflower oil with 11% of stearic acid was subjected to partial random interesterification as described in examples 3 and 4. The changes in the TAG composition of the oil after this step are shown in Table 3. The amount of trisaturated and disaturated TAGs of partial random interesterified HSHO oil slurry was lower than in previous examples, so the crystallization conditions applied were final temperature of 6° C. for 48 h. The partial random interesterified oil was then submitted to a fractionation described in examples 3 and 4. The rearrangement and fractionation allows the crystallization of oils with low content of stearic acid, giving place to yields close to 25% and stearin compositions similar to those obtained using the HSHO sunflower oils with higher initial stearic acid content (examples 3 and 4). The content of disaturated and trisaturated was lower in resulting stearin than in previous examples with higher initial amount of stearic acid. The unexpected and improved properties of these stearins are due to the disaturated and trisaturated TAG species with at least one molecule of stearic acid that are accumulated in the stearin, that in this case increased more than 3 times, whereas disaturated TAG without stearic acid increased only 1.5 times.

TABLE 3

TAG classes composition of HSHO oil, before, and after partial random interesterification and the corresponding stearin, HS 11, EIE HS 11 and Stearin 11, respectively.

|  | HS 11 | EIE HS 11 | Stearin 11 |
| --- | --- | --- | --- |
| SSS (%) | 0.0 | 0.5 | 1.3 |
| SUS + SSU (%) | 5.8 | 7.2 | 19.5 |
| USU + SUU (%) | 41.4 | 35.2 | 34.1 |
| UUU (%) | 52.7 | 57.3 | 45.0 |

S: saturated fatty acid, U: unsaturated fatty acid.
Data expressed in % (w/w).

In this example, Stearin 11 was obtained at the final crystallization and filtration temperature of 6° C., being the Ssn-2 value 23.6% and the Stotal 26.6%, therefore the partial random Ssn-2/Stotal×100 value was 23.6/26.6× 100=88.8, and the ratio of disaturated TAG with one oleic acid to disaturated TAG with one linoleic acid, SOS/SLS was 20.7.

Example 6

Fractionation of Blended Oil with Different Levels of Partial Random Interesterification The composition and properties of stearins obtained from HSHO oils applying the method described in this invention can be altered by changing the conditions of the interesterification step or by fractionating blends of interesterified oils, or stearin obtained from interesterified oils and non-modified oil, fats or stearins. In the first case, a different degree of partial random interesterification can be obtained running the reaction for shorter times. In that case, the level of trisaturated and disaturated asymmetric TAGs in the oil would be lower and the partial random value of the stearin fat Ssn-2/Stotal×100 would be smaller. These partial random oils can be fractionated as reported in this invention, without dewaxing and obtaining high yields of stearin product. Moreover, the fractionation of these oils would produce stearins with different melting profiles, which would be of interest for making them more adequate for hard, medium or softer food applications. Another way to obtain the same effect is making blends of random enzymatically interesterified oils and/or chemically interesterified oil, with non-modified HSHO oils or with sn-1,3 specifically enzymatic interesterified oils. In this example, HSHO sunflower oil was interesterified as described in examples 3 and 4 for 16 h to obtain a fully interesterified oil. This oil was blended with the initial non-modified oil, for example HSHO sunflower oil from Table A or HS 4 or HS 5 from Table B, to obtain different oil blends, namely HS 16, HS 12, HS 18, HS 13, HS 14 and HS 15 with increasing proportion, from 20% to 90% of non-modified oil, making oils with different levels of trisaturated and disaturated randomized TAG (Tables 4A & 4B). And HS 17, blend of a partial random stearin (10%), for example a stearin from Table C, with 90% of non-modified HOHS oil.

TABLE 4A

|  | HS 12 | HS 13 | HS 14 | HS 15 | HS 16 | HS 17 | HS 18 |
| --- | --- | --- | --- | --- | --- | --- | --- |
| SSS (%) | 0.5 | 1.0 | 1.1 | 1.8 | 0.3 | 0.4 | 0.2 |
| SUS + SSU (%) | 11.5 | 12.7 | 13.6 | 16.5 | 11.5 | 12.8 | 10.6 |
| USU + SUU (%) | 48.9 | 46.8 | 44.7 | 42.3 | 48.5 | 49.1 | 47.2 |
| UUU (%) | 38.9 | 39.6 | 40.8 | 39.5 | 39.2 | 37.7 | 42.0 |

TABLE 4B

|  | Stearin 12 | Stearin 13 | Stearin 14 | Stearin 15 | Stearin 16 | Stearin 17 | Stearin 18 |
| --- | --- | --- | --- | --- | --- | --- | --- |
| SSS (%) | 1.4 | 2.6 | 3.2 | 3.8 | 1.0 | 1.9 | 1.6 |
| SUS + SSU (%) | 32.3 | 41.4 | 39.6 | 33.4 | 25.8 | 24.4 | 27.8 |
| USU + SUU (%) | 39.0 | 36.3 | 36.6 | 37.4 | 42.1 | 42.4 | 38.9 |
| UUU (%) | 27.1 | 19.8 | 20.5 | 25.3 | 31.4 | 31.4 | 31.2 |
| SOS/SLS | 35.4 | 25.5 | 22.5 | 22.8 | 24.6 | 113.0 | 4.0 |

TABLE 4B-continued

|  | Stearin 12 | Stearin 13 | Stearin 14 | Stearin 15 | Stearin 16 | Stearin 17 | Stearin 18 |
|---|---|---|---|---|---|---|---|
| Ssn-2 (%) | 9.8 | 25.4 | 27.8 | 29.6 | 10.1 | 4.4 | 14.4 |
| Stotal (%) | 37.4 | 44.8 | 44.8 | 39.4 | 33.1 | 32.9 | 33.2 |
| Ssn-2/Stotal × 100 | 27.2 | 59.8 | 66.5 | 77.0 | 30.6 | 13.5 | 43.5 |

Partial random interesterified oil blends, displaying higher contents of trisaturated and disaturated TAGs, were fractionated as depicted in previous examples. Having the same behaviour than previous fractionation, with crystallization at low temperature and easy and fast filtration, crystallization and filtration temperatures ranged from 6° C. to 14° C. These stearins corresponding to these series of fractionations are shown in Table 4B. As previously evidenced, mainly stearic, arachidic and behenic acids increase in these stearin, in this example by 1.7 to 2.4 times Stearins were obtained with yields ranging from 20.6% to 34.5%. The stearin yield increased when proportion of saturated fatty acids, mainly stearic, arachidic and behenic acids, increase and random interesterified oil content in the blend is higher, in this case was from 10% to 90%. The Ssn-2/Stotal×100 values of the stearins ranged from 13.5 to 77.0. This makes stearins to have different physical properties suitable for different food applications.

As expected, the ratio Ssn-2/Stotal×100 values of the stearins were lower than those found in previous examples. This example illustrates that it is possible to control the level of randomization of saturated fatty acid in the product by fractionating blends of non-modified oils with different proportions of randomized oil or stearins.

Example 7

Stearin from HSHO Partially Rearranged Oils with Higher Levels of Linoleic Acids Several different HSHO oils, with higher contents of linoleic acid, HS 20, HS 23, HS 25 and HS 26, with 14.2%, 21.4%, 21.4% and 16.3%, respectively, of linoleic acid were partial random interesterified and fractionated. The resulting stearins are shown in Table 5.

TABLE 5

TAG classes composition, ratio of disaturated TAG with one oleic
to disaturated TAG with one linoleic, final fractionation temperature,
saturated in sn-2 position, total saturated and Ssn-2/Stotal ×
100 value of stearins with higher levels of linoleic acids.

|  | Stearin 20 | Stearin 23 | Stearin 25 | Stearin 26 |
|---|---|---|---|---|
| SSS (%) | 4.0 | 4.6 | 10.6 | 3.5 |
| SUS + SSU (%) | 43.2 | 33.2 | 52.6 | 37.3 |
| USU + SUU (%) | 33.6 | 37.8 | 23.2 | 32.7 |
| UUU (%) | 19.2 | 24.4 | 13.6 | 26.5 |
| SOS/SLS | 4.9 | 2.3 | 4.4 | 3.2 |
| Fractionation temperature (° C.) | 6 | −1 | 6.4 | 8 |
| Ssn-2 (%) | 29.8 | 30.2 | 39.2 | 24.8 |
| Stotal (%) | 46.2 | 39.7 | 53.5 | 41.9 |
| Ssn-2/Stotal × 100 | 64.5 | 76.0 | 73.2 | 59.3 |

S: saturated fatty acid, U: unsaturated fatty acid, O: oleic acid and L: linoleic acid.
Data expressed in % (w/w).

Trisaturated TAG of these partial random interesterified stearins varied from 3.5% to 10.6%, and the disaturated TAG (SUS+SSU) from 33.2% to 52.6%. Stearins obtained from partial random interesterified oils with higher contents of linoleic acid (Stearin 20, Stearin 23, Stearin 25 and Stearin 26) were obtained with yields of 18.4, 63.7, 35.5 and 21.0 respectively and showed compositions similar to those obtained from oils displaying lower contents of linoleic acid. Thus, the stearins described in this example show, that higher initial contents of linoleic acid can vary without affecting resulting stearin characteristics, being the ratio SOS/SLS higher than 2. These results show that the type of unsaturated fatty acid does not affect the procedure of interesterification plus fractionation and combination of unsaturated fatty acids in original oil can vary freely. The proportion of saturated fatty acids, mainly the stearic, arachidic and behenic acids determinates widely stearin characteristics.

Example 8

Solvent Fractionation of Partial Random HSHO Fats

HSHO oilseed partial random interesterified oils or fats can be fractionated with solvents, such as acetone or hexane, as in this example, to obtain a stearin fat enriched in saturated fatty acids.

Solvent fractionation can be applied to HSHO oils or fats by dissolving the fat in a specific proportion of solvent and keeping the micelle at the appropriate temperature for several hours with slow shaking or without it, after filtration stearin fats with higher content of saturated fatty acids in TAG than the starting materials is obtained. Solvent fractionation temperatures can be from 25° C. to −20° C. and at several ratios of oils or fats to solvent of, for example 1/0.2 to 1/11, can be applied. In this example two HSHO fats, Stearin 30 and Stearin 32 with partial randomized values of 26.3 and 43.59 respectively, were fractionated with acetone at 12° C. for 24 h, and a ratio of stearin to acetone of 1 to 4. Stearin 33 with partial randomized value of 19.9 was fractionated with hexane at 0° C. for 48 h, and a ratio of stearin to hexane of 1 to 2. Once the crystallization step was over, the micelle was filtered at vacuum and the resulting filtrate washed with fresh solvent to remove entrapped olein.

The three stearins obtained, Stearin 30-1, Stearin 32-1, Stearin 33-1 were then melted and distilled at vacuum to remove the solvent.

TABLE 6

TAG classes composition of HSHO sunflower stearins before and after solvent fractionation.

|  | Stearin 30 | Stearin 32 | Stearin 33 | Stearin 30-1 | Stearin 32-1 | Stearin 33-1 |
|---|---|---|---|---|---|---|
| SSS (%) | 1.5 | 3.3 | 1.9 | 5.5 | 10.3 | 6.1 |
| SUS + SSU (%) | 42.6 | 40.3 | 37.1 | 76.9 | 76.8 | 84.5 |
| USU + SUU (%) | 32.4 | 32.5 | 39.5 | 10.8 | 8.6 | 7.2 |
| UUU (%) | 23.5 | 23.9 | 21.5 | 6.8 | 4.3 | 2.2 |

S: saturated fatty acid,
U: unsaturated fatty acid.
Data expressed in % (w/w).

For Stearins 30-1, 32-1 and 33-1, the $S_{sn-2}$ value were 19.2%, 39.7% and 15.9%, and the $S_{total}$ 64.0%, 67.2% and 70.9% respectively. Accordingly, the partial random Ssn-2/Stotal×100 value were 30.1, 59.2 and 22.4 and the ratio of disaturated TAG with one oleic acid to disaturated TAG with one linoleic acid, SOS/SLS were 167.4, 108.7 and 117.0 respectively. Trisaturated TAG of these partial random interesterified stearins were from 5.5% to 10.3%, similar to dry fractionation samples, but the disaturated TAG (SUS+SSU) were from 76.8% to 84.5%, much higher than dry fractionation ones. Stearins were obtained with yields between of 19.0 and 29.0.

Example 9

Solid Fat Contents of Stearins Obtained from Partial Random Interesterified HSHO Oils Compared with those From Non-Modified Oil and Fully Random Interesterified Oil The method described in this patent, involving fractionation of partial random interesterified HSHO oils, makes it possible the production of stearins having different TAGs and fatty acids distribution on TAGs than previous disclosed HSHO seed oil stearins. Furthermore, partial random interesterified HSHO stearins can be obtained at a higher yield and displayed better solids fat contents than stearins obtained by fractionation of non-modified HSHO or even from fully random interesterified oils. Table 7 shows the solid fat contents measured by pNMR of 6 stearins at four temperatures embracing a range from 10° C. to 40° C. Three of these stearins were obtained by partial random interesterification plus fractionation (Stearin 13, Stearin 20 and Stearin 14), two by fully random interesterification plus fractionation, (Stearin 27 and Stearin 28) and one of them by fractionation of non-modified HSHO oil, (Stearin 3).

TABLE 7

Solid fat content (SFC) by pNMR at several temperatures, the trisaturated plus the different types of disaturated TAG content, total saturated, saturated in sn-2 position and Ssn-2/Stotal × 100 value of three different partially randomized stearins (Stearins 13, 20 and 14), compared with two fully random stearins (Stearins 27 and 28) and a non-modified one (Stearin 3).

| Sample | SFC (%) by pNMR | | | | SSS + SUS (%) | Stotal (%) | Ssn-2 (%) | Ssn-2/Stotal × 100 |
| | 10° C. | 20° C. | 30° C. | 40° C. | | | | |
|---|---|---|---|---|---|---|---|---|
| Stearin 13 | 49.3 | 35.8 | 10.5 | 2.2 | 43.9 | 48.8 | 29.2 | 59.8 |
| Stearin 20 | 44.2 | 31.8 | 10.7 | 2.8 | 47.2 | 46.2 | 34.5 | 74.6 |
| Stearin 14 | 45.1 | 33.6 | 10.8 | 2.7 | 42.8 | 44.8 | 29.8 | 66.5 |
| Stearin 27 | 37.2 | 27.8 | 12.4 | 2.7 | 44.7 | 43.7 | 43.7 | 100.0 |
| Stearin 28 | 29.2 | 21.1 | 9.7 | 2.2 | 37.4 | 40.4 | 40.4 | 100.0 |
| Stearin 3 | 33.5 | 22.3 | 0.1 | 0.4 | 37.8 | 39.1 | 3.5 | 8.9 |

S: saturated fatty acid,
U: unsaturated fatty acid,
SUS represent SUS + SSU.

All of them were obtained from HSHO seed oils containing similar amount of saturated fatty acids. The stearins obtained from partially random interesterified oils displayed higher solid fat contents than equivalent non-modified stearin at all the temperatures assayed, which make them more appropriate for formulations requiring plastic fats. Moreover, they displayed more solid fat content than the equivalent stearins obtained from fully random interesterified fats at 10 and 20° C., slightly lower at 30° C. and similar levels at 40° C. Accordingly, stearins obtained from partially random interesterified HSHO supply more solid fat content than previous ones for applications requiring fats with an appropriated content of solids at a broad range of temperature, being suitable for bakery, margarine, confectionary, coating compounds, ice cream, filing fats or spread formulation.

The invention claimed is:

1. Stearic oilseed stearin fat having a content of stearic acid higher than 11% (w/w), comprising:
    from 19% to 95% of disaturated triglycerides in which the (w/w) ratio of disaturated triglycerides with one oleic acid to disaturated triglycerides with one linoleic acid (SOS/SLS) is higher than 2.3;
    and at least 1% of trisaturated triglycerides;
    in which the $S_{sn-2}/S_{total}×100$ value is of from 11 to 98.

2. Stearic oilseed stearin fat according to claim 1, wherein it is obtained from seed oils selected from sunflower, brassica, cotton, maize, peanut, soybean or safflower oilseeds or mixed thereof; the oils containing
    more oleic acid than linoleic acid;
    more than 11% of stearic acid;
    and up to 24% of linoleic acid.

3. Stearic oilseed stearin fat according to claim 1, wherein it comprises from 19% to 89% of disaturated triglycerides.

4. Stearic oilseed stearin fat according to claim 1, wherein the total amount of trisaturated triglycerides is higher than 1.3%.

5. Stearic oilseed stearin fat according to claim 1, wherein the $S_{sn-2}/S_{total}×100$ value is of from 13.5 to 95.6.

6. Stearic oilseed stearin fat according to claim 1, wherein the total amount of triunsaturated triglycerides is higher than 2.2%.

7. Stearic oilseed stearin fat according to claim 1, wherein the stearic oilseed stearin fat contains at least 625 ppm of waxes.

8. A process for preparing the stearic oilseed stearin fat according to claim 1, the process comprising the following steps:
   a) interesterification of HSHO seed oils by using any commercial lipase resulting in partial random rearrangement of saturated fatty acid into the triglycerides molecules; and
   b) at least one fractionation of the partial random interesterified HSHO seed oils or their stearins.

9. A process according to claim 8, wherein the interesterification is carried out by using between 0.1% to 10.0% of any commercial lipase at a temperature of from 50° C. to 80° C., for a period of time of from 20 minutes to 30 hours.

10. A process according to claim 8, wherein the fractionation step is a dry fractionation comprising the steps of crystallisation by:
   cooling of completely melted oil to a temperature in the range of from 5° C. to 25° C. during a period of time of from 20 minutes to 15 hours,
   and then cooling to a final temperature in the range of from −10° to 22° C. for a period of time of from 10 minutes to 48 hours; and
   separation the solid stearin and liquid olein by pressure filtration, vacuum filtration or centrifugation.

11. A process according to claim 8, wherein the fractionation step is a solvent fractionation conducted by using organic solvent or a blend of solvents with a ratio oil to solvent (v/v) of from 1/0.2 to 1/11 at temperature of from 25° C. to −20° C.

12. A process for preparing the stearic oilseed stearin fat according to claim 1, the process comprising at least one fractionation of a mixture of interesterified high stearic seed oil, fat or stearin and no interesterified no hydrogenated high stearic oil, fat or stearin, in which the mixture consists of 10% to 90% interesterified high stearic seed oil, fat or stearin.

13. Shortening, margarine, spread, blended spread, bakery fat, frying fat, filling fat, coating compound, confectionary fat or ice-cream fat containing the stearic oilseed stearin fat according to claim 1.

14. A method comprising preparing shortening, margarine, spread, blended spread, bakery fat, frying fat, filling fat, coating compound, confectionary fat or ice-cream fat from the stearic oilseed stearin fat according to claim 1.

\* \* \* \* \*